United States Patent
Kasperson et al.

(10) Patent No.: US 12,445,363 B1
(45) Date of Patent: Oct. 14, 2025

(54) CLOUD CONNECTION STATE MONITORING UTILIZING UNSTABLE CONNECTION STATE ANALYSIS

(71) Applicant: Hewlett Packard Enterprise Development LP, Spring, TX (US)

(72) Inventors: David Kasperson, Austin, TX (US); Geoffery Schunicht, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 53 days.

(21) Appl. No.: 18/624,003

(22) Filed: Apr. 1, 2024

(51) Int. Cl.
*H04L 43/0811* (2022.01)
*H04L 43/106* (2022.01)

(52) U.S. Cl.
CPC ........ *H04L 43/0811* (2013.01); *H04L 43/106* (2013.01)

(58) Field of Classification Search
CPC ............................ H04L 43/0811; H04L 43/106
See application file for complete search history.

(56) References Cited

U.S. PATENT DOCUMENTS

| | | | |
|---|---|---|---|
| 9,250,771 B1 * | 2/2016 | Décoret | G06F 3/04895 |
| 10,887,206 B2 * | 1/2021 | Kasperson | H04L 41/20 |
| 11,082,338 B1 * | 8/2021 | Saha | H04L 45/70 |
| 2010/0146075 A1 * | 6/2010 | Helaine | H04W 76/19 |
| | | | 709/224 |
| 2015/0281020 A1 * | 10/2015 | Yun | H04L 43/0847 |
| | | | 370/252 |
| 2015/0295802 A1 * | 10/2015 | Balakrishnan | H04L 41/0823 |
| | | | 370/248 |
| 2021/0409331 A1 * | 12/2021 | Nguyen | H04L 45/70 |
| 2023/0077664 A1 * | 3/2023 | Doyle | H04W 48/16 |
| | | | 370/329 |
| 2023/0096637 A1 * | 3/2023 | Syed | G06F 3/061 |
| | | | 714/37 |
| 2024/0430757 A1 * | 12/2024 | Dion | H04W 36/00222 |

OTHER PUBLICATIONS

HPE, "Get a Server", HPE GreenLake Developer Portal, available online at <https://developer.greenlake.hpe.com/docs/greenlake/services/compute-ops/public/openapi/compute-ops-latest/operation/get_v1beta2_server_by_id/>, 2024, 8 pages.

* cited by examiner

*Primary Examiner* — Jerry B Dennison
(74) *Attorney, Agent, or Firm* — Slater Matsil, LLP

(57) ABSTRACT

In an example implementation consistent with the features disclosed herein, a computer-implemented method includes receiving a connection request from a client, connecting the client to a server in response to the connection request, identifying a disconnection from the client, and disconnecting the client from the server in response to the disconnection request. The method includes determining a time between the connection request and the disconnection. When the connection request and the disconnection is less than a threshold time, the method includes transmitting messaging and withholding the messaging until the connection request and the disconnection is greater than a threshold time.

20 Claims, 10 Drawing Sheets

CLOUD CONNECTION STATE MONITORING UTILIZING UNSTABLE CONNECTION STATE ANALYSIS

BACKGROUND

Cloud computing systems enable users to access shared computing resources, including software applications, servers, storage, and network services, over the Internet or other network. Cloud computing systems offer many advantages, such as scalability, flexibility, and cost-effectiveness. A cloud-based service may connect to another cloud-based service or on-premises device and an on-premises cloud enabled device may connect to a cloud based service. The connection with a cloud-based service may be a state-managed cloud connection. State-managed cloud connections are generally in a state of connected or disconnected. The state of the connection is tracked and provided to users through an application programming interface (API) or graphical user interface (GUI). The state of the connection is provided to the user by traveling up a management stack to inform the user when the services or devices are "connected" or "disconnected."

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
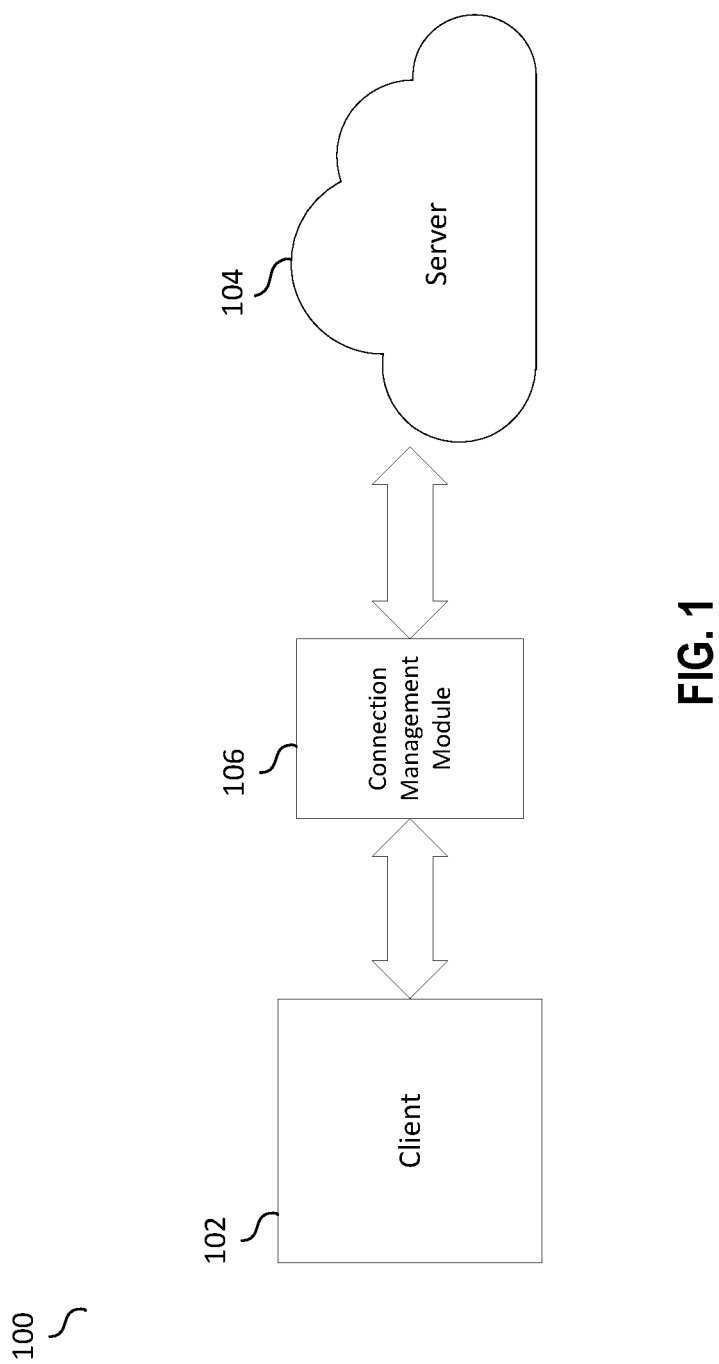
FIG. 1 illustrates an example system for managing and utilizing an unstable connection state, according to certain implementations.

State-managed cloud connections generally include two states of connection, connected and disconnected. This approach may not provide enough granularity in tracking the state of the cloud connection. Having only two states (Connected and Disconnected) can be limiting, when there are intermediate states that can affect the performance or reliability of the connection.

Cloud connections may experience connection flapping or rapidly changing states over a short period of time. For example, if there is a brief interruption in the connection, it may cause the connection to rapidly transition back and forth between the two states, causing unnecessary notifications for the user. The changing states may occur for a variety of reasons. For example, the state of the connection may change when servers are in a continuous boot loop due to PxE being configured without a target, unstable power, a failing network switch, or other faulty hardware. In addition to rapidly changing states, internet provider issues and cloud hosting environment issues may also affect the connectivity state. When the cloud connection changes between "connected" and "disconnected," a cloud connection event is sent up the management stack and into a database through mechanisms including messages, representational state transfer (REST), and cloud events. The state of the connection is provided to the user each time the connection changes between "connected" or "disconnected." The processing of these changes and events can overwhelm the management stack processing these changes thus limiting scale. Rapidly changing states may also affect the usability of the API or GUI during this process or the "quality" of the data for the device experiencing changing of connection states.

One possible way to alleviate some of the issues may be to reduce the frequency of notification to the user. However, without notifications, the user will not be able to resolve connectivity issues if they are not aware of the changing state of the connection. In addition, the GUI or second tier management solution may not recognize that the cloud connection is rapidly changing states.

Certain implementations provide an additional state augmented with additional information based on what is happening with the connection. The additional state may be denoted, for example, as "unstable" or "disconnected" with an additional reason indicating connection flapping, such as "reconnecting" or "data gathering." This additional information helps to provide context for the user, enabling them to better understand what is happening in the system. For example, if a cloud connection is in a state of "reconnecting," the user may be able to infer that there is a problem with the network connection, and may be able to take corrective action to fix the problem.

Certain implementations may include a connection management system. The connection management system may send a notification when entering or leaving this additional state. Notifications would not, however, be sent for transitions between a nominal "connected" and "disconnected" sub-state of the additional "unstable" state. The additional state reduces the need to process workflows triggered by connection changes for the management service, management stack, database, and GUI. This state management helps to overcome the processing limitations of the management stack due to rapid changes in the connection state. For example, if a cloud connection is rapidly changing state due to unstable power or faulty hardware, the management stack may be inundated with notifications and may be unable to process all of the changes. By limiting the number of notifications sent up the management stack, the management stack can effectively process the changes without becoming overwhelmed.

Certain implementations may apply an algorithm to determine when to mark the cloud connection as being in the additional state and when to exit the state. The algorithm may be pre-defined or modifiable by the operator. For example, if a connection has X connection state changes within a delta-X time period, the connection will transition into the "unstable" state. If the connection does not have connection state changes in the "unstable" state for delta-y time period, the connection will transition out of the "unstable" state into the "connected" or "disconnected" state. In certain implementations, the state of the connection may be provided to users of the service stack at one or both ends.

The following disclosure provides many different examples for implementing different features. Specific examples of components and arrangements are described below to simplify the present disclosure. These are, of course, merely examples and are not intended to be limiting.

Referring to FIG. 1, a block diagram of a system 100 is depicted. The system 100 includes a client 102 and a cloud service 104, which are interconnected through a connection management module 106. In some aspects, the client 102 may be an on-prem based service, an on-prem application, or a device. The cloud service 104, in some cases, may be a cloud-based service or a cloud application (e.g., a group of services running on connected servers). The symbols used in the figure are illustrative only and are not intended to limit the system implementation. For example, the connection management module 106 may be part of the cloud service 104.

The client 102 is configured to send and receive data to and from the connection management module 106. The connection management module 106, in turn, manages the communication with the cloud service 104. This arrangement facilitates the monitoring and management of the cloud connection state between the client and the server, thereby enhancing the efficiency and effectiveness of cloud connection state management.

The cloud service 104 typically includes a network of interconnected servers within data centers that are strategically placed to reduce latency and enhance service reliability. The hardware components include servers with CPUs, memory, storage drives (like SSDs or HDDs), network devices like switches and routers, and possibly specialized hardware like load balancers and firewalls for traffic management and security. These data centers also include redundant power supplies, cooling systems, and physical security measures to ensure continuous and secure operation of the hardware.

On the software side, cloud service implementation can utilize a stack of technologies. For example, at the foundation, a hypervisor or virtualization layer is employed on the servers to create and manage virtual machines (VMs), allocating resources dynamically as needed to each VM. Above the virtualization layer, cloud management platforms (such as OpenStack, VMware, or proprietary software, e.g., HPE's GreenLake cloud platform) provide tools to orchestrate, automate, and manage resources and workloads. Moreover, containerization platforms may be used to efficiently deploy and manage applications within the cloud. Additional software components include operating systems for the servers, middleware to facilitate communication between software components, and security tools for encryption, access control, and threat detection.

While discussed herein in the context of cloud services, it is understood that the concepts disclosed herein are not limited to a cloud context. Any client/server arrangement can utilize the implementations discussed here.

In traditional cloud computing systems, the state of a cloud connection is typically managed as either "connected" or "disconnected". While this binary approach may be sufficient in some scenarios, it may not provide enough granularity in tracking the state of the cloud connection in others. For instance, when a cloud connection experiences rapid state changes, or "flapping," the system may generate excessive notifications, potentially overwhelming the management stack and affecting the performance or reliability of the connection.

In this example, the connection management module 106 is capable of sending a notification when entering or leaving an additional state. However, full notifications are not sent for transitions between a nominal 'connected' and 'disconnected' sub-state of the additional 'unstable' state. This approach reduces the processing load on the management service, management stack, database, and graphical user interface (GUI), thereby overcoming the processing limitations associated with rapid changes in the connection state.

The connection management module 106 can apply an algorithm to determine when to mark the cloud connection as being in the additional state and when to exit the state. The algorithm may be pre-defined or modifiable by the user, providing further flexibility in managing cloud connections. Further details related to several example algorithms are discussed below.

Connection management module 106 can be implemented in hardware or software, e.g., a computer device that executes instruction code. In one implementation, the module 106 is implemented in hardware that executes a state machine. The hardware could be, for example, an ASIC (application specific integrated circuit) or FPGA (field programmable gate array). Thresholds and other variable described below can be hard-coded or stored in programmable registers depending upon the application. Combinations of hardware and software are also envisioned.

The following examples discuss the implementation of a state machine (e.g., finite state machine), which is implemented by defining a finite set of states that a system can be in at any given time, along with the transitions that move the system from one state to another based on inputs or events. In its implementation, each state is associated with behaviors or actions, while transitions are the rules or conditions that trigger a change in state. Based on the input or events, the state machine transitions to other states following the predefined paths.

Figure 2A:
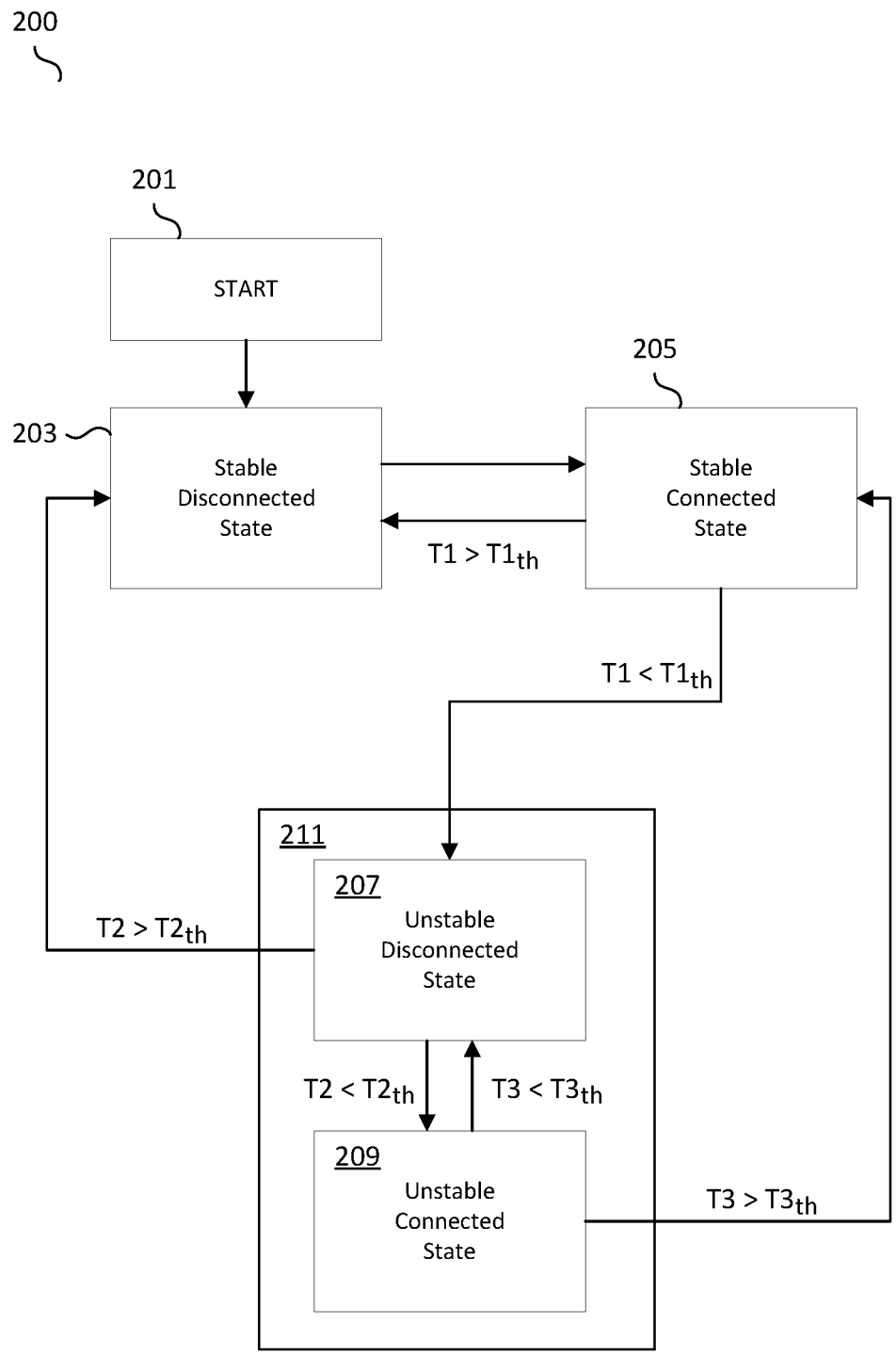
FIGS. 2A-2B illustrate an example state diagram and flowchart for managing and utilizing an unstable connection state, according to certain implementations.

FIG. 2A illustrates an example state diagram for managing connection between the client 102 and cloud service 104. This example utilizes an unstable connection state. In the example of FIG. 1, the management would be controlled by the connection management module 106. In other implementations, the management can be controlled elsewhere.

The process begins at the start box 201, indicating the initiation of the state monitoring sequence. The initiation could be implemented as a registration of a client 102 (e.g., a client device) for use of cloud based services performed at the cloud service 104. After initiation, the state diagram shows a transition to a stable disconnected state box 203, which represents the initial disconnection state of the cloud service. The process will begin in the disconnected state, i.e., no service has been initiated at the cloud service 104.

The state will remain disconnected until a connection is initiated. For example, the client 102 can request a service to be provided by cloud service 104. Alternatively, the connection may also be initiated by the cloud service 104. Upon receipt of the request, the state machine will transition to the stable connected state 205. In this state, the client 102 and cloud service 104 can communicate in a manner to allow the service to be provided.

Cloud-based services offer a broad range of solutions. Example include software as a service (SaaS) to deliver applications over the network, infrastructure as a service (IaaS) to provide virtualized computing resources, platform as a service (PaaS) that offer hardware and software tools for application development, storage as a service for online data storage and backup, and database as a service (DBaaS) to provide managed database solutions. Additionally, numerous specialized services such as machine learning as a service (MLaaS), desktop as a service (DaaS), and communication as a service (CaaS) are available to cater to specific industry needs. This list of examples is not intended to be exhaustive.

Upon completion of the task, a disconnection can be initiated by a change in the environment (e.g., power or networking) or by one of the components, e.g., the client 102, server 104, or another device (e.g., connection management module 106). The state changes can be communicated using messaging through asynchronous notification or through a polling mechanism, as examples. Example messaging for these transitions will be briefly described.

For the transition from the disconnected state to the connected state, a discovery message can be used to request to locate and identify available cloud services. This message could be a network broadcast or a directed message to a known service endpoint. Once the cloud service is identified, the client 102 can send a connection request message to the cloud service 104, which could include authentication data and other connection-relevant parameters. The cloud service 104 responds with an authentication challenge, and the client 102 provides the necessary credentials or tokens. If successful, the cloud service 104 sends an authorization confirmation. The cloud service 104 may also send configuration data or initialization parameters necessary for the client to effectively utilize the service and the client 102 can acknowledge receipt of the configuration data and confirm its readiness to operate in the connected state. The cloud service 104 might then send a final service ready notification message to indicate that the connection is established, and the client 102 is now in the "connected" state and can utilize cloud resources.

Once the state is set to connected, the cloud service may run jobs/workflows. These operations can consume CPU and network resources. As will be discussed below, when the connection becomes unstable it is beneficial to limit work being done thus saving processing.

The transitioning from the connected to the disconnected state can be initiated by the client 102, the cloud service 104, or the environment. For example, the client 102 may initiate a disconnection request when it no longer needs the cloud services or when it needs to terminate the session for any reason (e.g., end of task, error conditions, or manual disconnection). In other examples, a disconnection can be triggered by network failures, power issues, or other conditions. The disconnection can be from a disconnection request or a disconnection detection, e.g., in the case of a cut cable, a loss of power, or other transient error.

The cloud service 104 may then respond with an acknowledgment of the disconnection and proceed to release any resources that were allocated to the client session. In some cases, the cloud service 104 may send summary data or log information about the session for record-keeping or billing purposes. The client 102 may acknowledge the resource release and session summary information and the cloud service 104 may send a final disconnection message confirming that the client 102 has been moved to the "disconnected" state and that the session is now closed. There may be additional housekeeping messages exchanged if necessary to clean up any remaining state or data from the client or server side.

It is noted that this description is quite general and could vary significantly depending on specific protocols used by the cloud service, security requirements, network architecture, and other factors. The foregoing provides just an example of the type of messaging that might occur.

During link flapping, the connect/disconnect states may change back and forth very rapidly. Examples scenarios in which this may occur may include unstable power on a connected interconnect, faulty hardware, a faulty cable, or situations in which servers are in a continuous boot loop due, for example, to preboot execution environment (PXE) configured without a boot target. In such scenarios, the processing of these changes may overwhelm the connection management module.

When the transitions occur quickly, the messaging and/or execution of workflows can be limited to avoid overwhelming the network. Referring again to FIG. 2A, the state machine will move from the stable connected state 205 into a disconnected state. In this implementation, the disconnected state will be either the stable disconnected state 203 or the unstable disconnected state 207. Here, the disconnected state is determined by a first time duration T1 between time of the entry of the connected state and the time of the disconnection.

As shown in the figure, the state will return to the stable disconnected state 203 when the first time duration T1 is greater than a first threshold $T1_{th}$ ($T1>T1_{th}$). Alternatively, the state will move to the unstable disconnected state 207 when the time duration T1 is less than the first threshold $T1_{th}$ ($T1<T1_{th}$). The threshold $T1_{th}$ can be determined based upon the specific implementation of the service. In one example, the connection management module 106 stores the threshold in a register that can be updated, for example, by the cloud service 104. In various examples, the first threshold $T1_{th}$ will be between 1 second and 300 seconds, e.g., 180 seconds.

Referring back to FIG. 2A, when a connect message is provided quickly, as indicated by the time T2 that the system was in the unstable disconnected state 207 being less than a second threshold $T2_{th}$ ($T2<T2_{th}$), the state will transition to the unstable connected state 209. This transition can occur with limited messaging, i.e., messaging that includes fewer bits (or no bits) being transferred than a standard connection message such as the message used to transition from stable disconnected state 203 to stable connected state 205. In some implementations, the system may transition to the unstable disconnected state 207 without messaging or while withholding messaging. In various examples, the second threshold $T2_{th}$ will be between 0 and 90 seconds.

When the time in the unstable disconnected state 207 is greater than the second threshold time $T2_{th}$ ($T2>T2_{th}$), an assumption can be made that the disconnection is stable. In that case, the system will move to the stable disconnected state 203. For example, if the second threshold $T2_{th}$ is 90 seconds, the system will move from the unstable disconnected state 207 to the stable disconnected state 203 when the second time duration T2 is greater than 90 seconds.

Similarly, when a disconnection is identified while the system is in the unstable connected state 209, a determination of stability can be based on a third threshold $T3_{th}$, which may be between 90 and 180 seconds. T3 is defined as the time the state machine has been in the unstable connected state 209. When the time T3 between entry to the unstable connected state 209 and identifying the disconnection is less than the threshold $T3_{th}$, the state machine will return to the unstable disconnected state 207 with limited messaging. In some implementations, the state machine may return to the unstable disconnected state 207 without messaging or while withholding messaging. In conditions of flapping, the system will quickly move between the unstable disconnected state 207 and unstable connected state 209 without adversely affecting the rest of the network. In various examples, connection flapping may occur when the second time duration T2 in the unstable disconnected state 207 is between 0 and 90 seconds and the third time duration T3 in the unstable connected state 209 is between 0 and 90 seconds. When the third time duration T3 is greater than the third threshold $T3_{th}$, an assumption can be made that the connection is stable and transition to the stable connected state 205.

In some implementations, the client 102 may request connection metrics from the connection management module 106. The connection metrics may include the number of transitions while in the unstable disconnected state 207 or unstable connected state 209 or the amount of time in an unstable state 211. For example, the connection metrics may provide the number of transitions in the unstable state over a specified period of time.

Figure 2B:
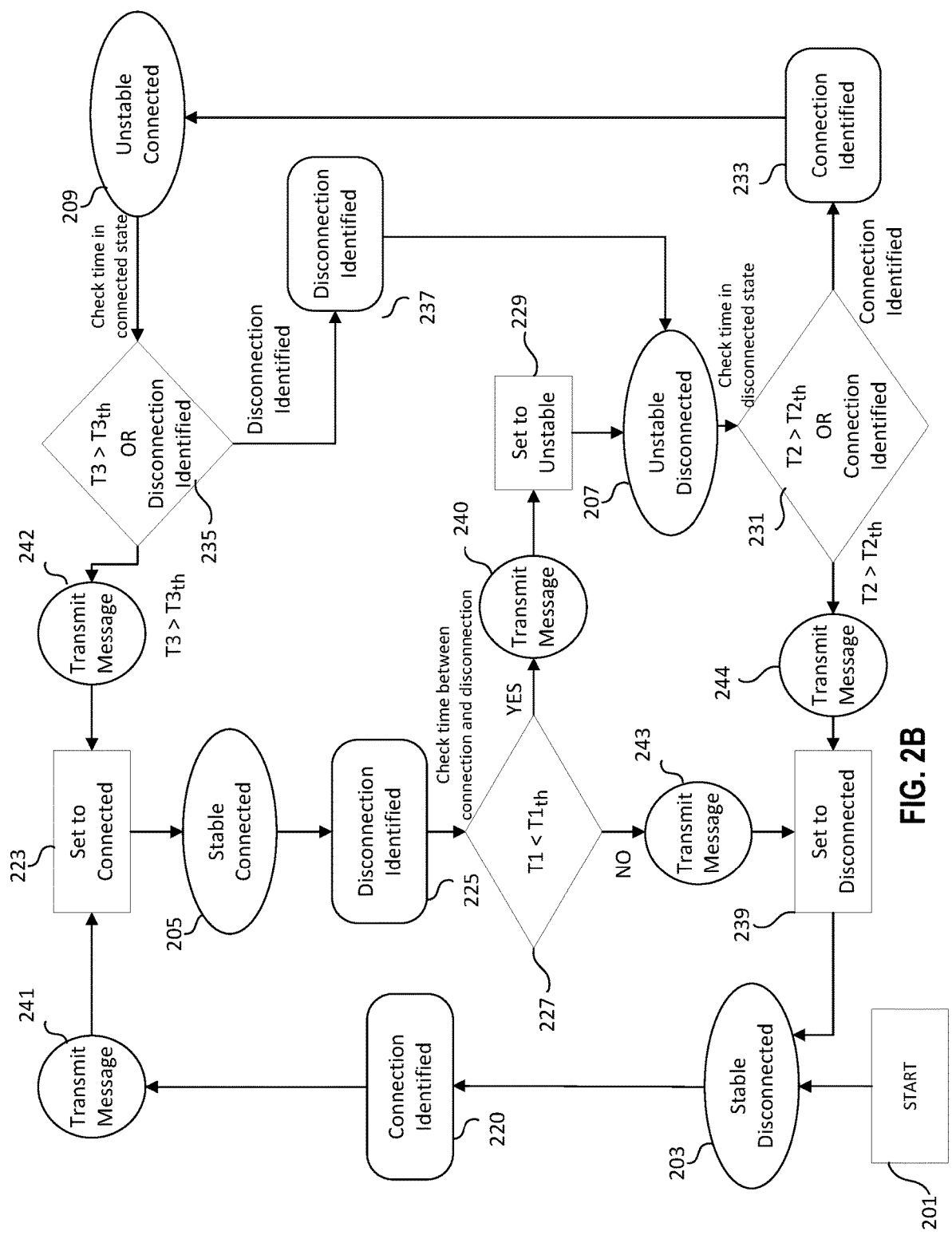

FIG. 2B illustrates an example flowchart representing FIG. 2A, according to certain implementations. The process begins at the start box 201 indicating the initiate of a state monitoring sequence. After initiation, the flowchart shows a transition to a stable disconnected state 203. When the connection is initiated between the client 102 and the cloud service 104, the connection management module 106 identifies that a connection has been made, as shown, for example, in box 220 and a message is transmitted in step 241. When the connection is identified, the flowchart transitions to box 223 to set to connected which transitions to the stable connected state 205.

While in the stable connected state 205, when a disconnection is identified in box 225, the connection management module 106 checks the time between when the connection was identified and when the disconnection was identified. In decision diamond 227, when the time T1 is greater than the first time threshold $T1_{th}$, a message is transmitted in step 243 and the flow transitions to box 239 to set to disconnected which returns to the stable disconnected state 203. On the other hand, when the time T1 is less than the first time threshold $T1_{th}$ in decision diamond 227, the flow transitions to step 240 to transmit a message. After the message is transmitted, the flow goes to box 229 to set to unstable which transitions to the unstable disconnected state 207.

From the unstable disconnected state 207, the connection management module 106 checks the time elapsed T2 in the unstable disconnected state 207. In decision diamond 231, when the time elapsed T2 is greater than the second time threshold $T2_{th}$, the flow transitions to step 244 to transmit a message. After the message is transmitted, the flow transitions to box 239 to set to disconnected which proceeds to the stable disconnected state 203. Alternatively, when a connection is identified while in the unstable disconnected state 207, the flow transitions to box 233 which transitions to the unstable connected state 209.

From the unstable connected state 209, the connection management module 106 checks the time elapsed T3 in the unstable connected state 209. In decision diamond 235, when the time elapsed T3 is greater than the third time threshold $T3_{th}$, the flow transitions to step 242 to transmit a message. After the message is transmitted, the flow transitions to box 223 to set to connected which proceeds to the stable connected state 205. On the other hand, when a disconnection is identified while in the unstable connected state 209, the flowchart transitions to box 237 which transitions to the unstable disconnected state 207.

In this example implementation, a message is transmitted when transitioning between the stable connected state and the stable disconnected state, as well as, upon transitioning into and out of the unstable state. This message may comprise detailed connection information, providing a user with comprehensive insights into the connection state. While in the unstable state, further messages are withheld. The withheld message may reduce the processing load on the management service, management stack, database, and graphical user interface (GUI).

In this example implementation, the flowchart may continuously loop and transition between the states based on the connections, disconnections, and time elapsed in the states.

Figure 3:
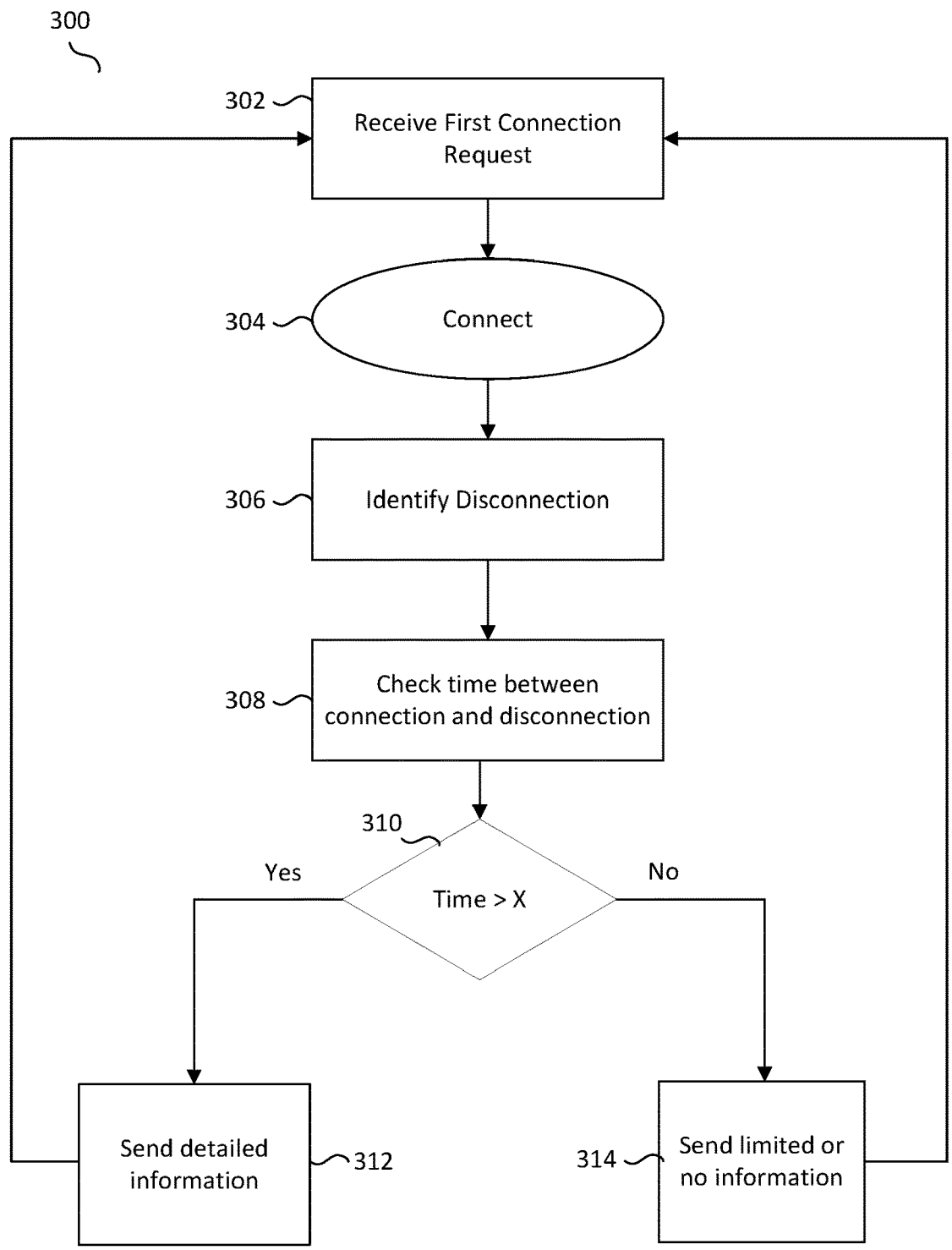
FIG. 3 illustrates an example flowchart for managing and utilizing an unstable connection state, according to certain implementations.

FIG. 3 illustrates an example block diagram for managing and utilizing an unstable connection state, according to certain implementations. This figure illustrates an implementation that can be performed with or without using a state machine.

Turning now to FIG. 3, a flowchart 300 of a method for managing cloud connection states is depicted. The process begins with the reception of a connection request as indicted by block 302. In some aspects, the connection request may be received from a client 102, e.g., while in a stable disconnected state 205 in the example of FIG. 2A. This leads to connection establishment in block 304, where the client 102 is connected to a cloud service 104 in response to the connection request.

Subsequently, a disconnection is identified as indicated in block 306. The identified disconnection can be from a disconnection request or detection of a disconnection, e.g., in the case of a cut cable, a loss of power, or other transient error. The disconnection may be identified from the client after a first time duration during which the service was provided. The method then involves checking the time between the connection and the disconnection (block 308), leading to a time comparison decision in block 310. If the time is greater than a predetermined threshold X, detailed information or messaging is transmitted as shown by block 312. In some aspects, the detailed information may comprise detailed connection/disconnection messaging as discussed above.

On the other hand, if the time is less than the predetermined threshold as indicated in block 314, limited messaging is transmitted. As discussed above, the limited messaging may comprise less detailed connection information than the detailed information provided in normal operation. The limited messaging may be, e.g., "disconnected", "unstable", or "disconnected-unstable". Subsequently, no messaging is transmitted after the limited messaging, i.e., when the connection is rapidly changing while in an unstable state 211. This approach allows for efficient communication of connection state changes, reducing the processing load on the management service, management stack, database, and graphical user interface (GUI).

In some aspects, transmitting the detailed information may comprise transmitting a connection status report to the client at a predetermined frequency. This approach provides further flexibility in managing cloud connections, enabling the system to adapt to varying connection conditions and user requirements.

Figure 4:
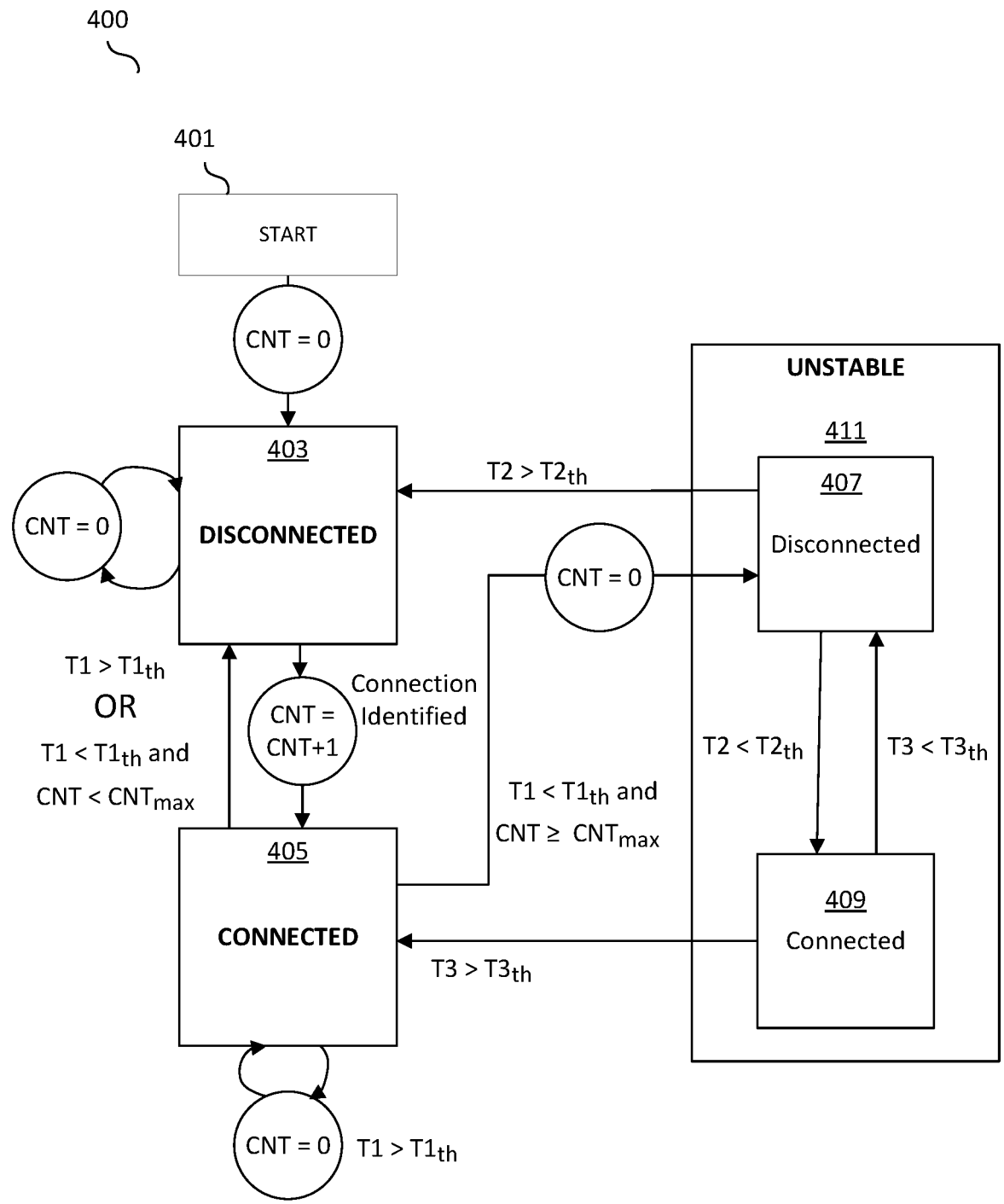
FIG. 4 illustrates an example state diagram for managing and utilizing an unstable connection state, according to certain implementations.

FIG. 4 illustrates another example state diagram for managing and utilizing an unstable connection state, according to certain implementations. The state machine illustrated in this figure is similar to that discussed with respect to FIG. 2A. As such, many of the details will not be repeated. This figure is presented as including three states, namely disconnected 403, connected 405, and unstable 411. The unstable state 411 includes two sub-states, namely disconnected 407 and connected 409. These unstable sub-states 407 and 409 can provide additional granularity in tracking the state of the cloud connection even though at a certain level it is only known that the state is unstable.

Except as discussed here, the operation of this state machine 400 is similar to what was discussed above.

Unlike the state machine 200, the state machine 400 remains in the stable states 403 and 405 for a number of iterations even if the timing requirements are not met. In this implementation a loop counter is initialized when the system first enters the stable disconnected state 403. When a connection is identified in the stable disconnected state 403, the loop count is incremented and the system enters the stable connected state 405. As long as the loop count CNT remains below a maximum count threshold $CNT_{max}$ ($CNT<CNT_{max}$) upon identifying a disconnection, the system moves from the stable connected state 405 to the stable disconnected state 403. If the system remains in the stable disconnected state 403 for a predetermined period of time, the loop counter is reset.

When a connection request is received in a short time (e.g., a time less than a threshold such as the first threshold $T1_{th}$), the system returns to the stable connected state 405 and increments the loop count. If the system remains in the stable connected state 405 for a predetermined period of time before identifying a disconnection, the loop counter is reset. Optionally, the loop counter can be incremented both when transitioning from the stable connected state 405 to the stable disconnected state 403 as well as from the stable disconnected state 403 to the stable connected state 405. When the loop count CNT exceeds the maximum loop count $CNT_{max}$, the system will move into the unstable disconnected state 407. The maximum loop count can vary in different implementations, for example, the maximum loop count may be 2 or 4.

The system will remain in the unstable state 411 moving between unstable disconnected state 407 and unstable connected state 409 until the time threshold requirements are met, as discussed above.

In some implementations, the system may provide notifications to the user when transitioning between the disconnected state 403, the connected state 405, and the unstable state 411. However, the system may not provide notifications for transitions between the unstable disconnected sub-state 407 and the unstable connected sub-state 409, thereby reducing the processing load on the management service, management stack, database, and graphical user interface (GUI).

While not shown in FIG. 4, in some implementations both the disconnected state 403 and connected state 405 have pathways to their respective unstable sub-states within the unstable state 411. This arrangement illustrates the system's ability to transition to an unstable state under specific conditions, such as when the connection state changes rapidly, indicating potential instability in the connection.

Figure 5:
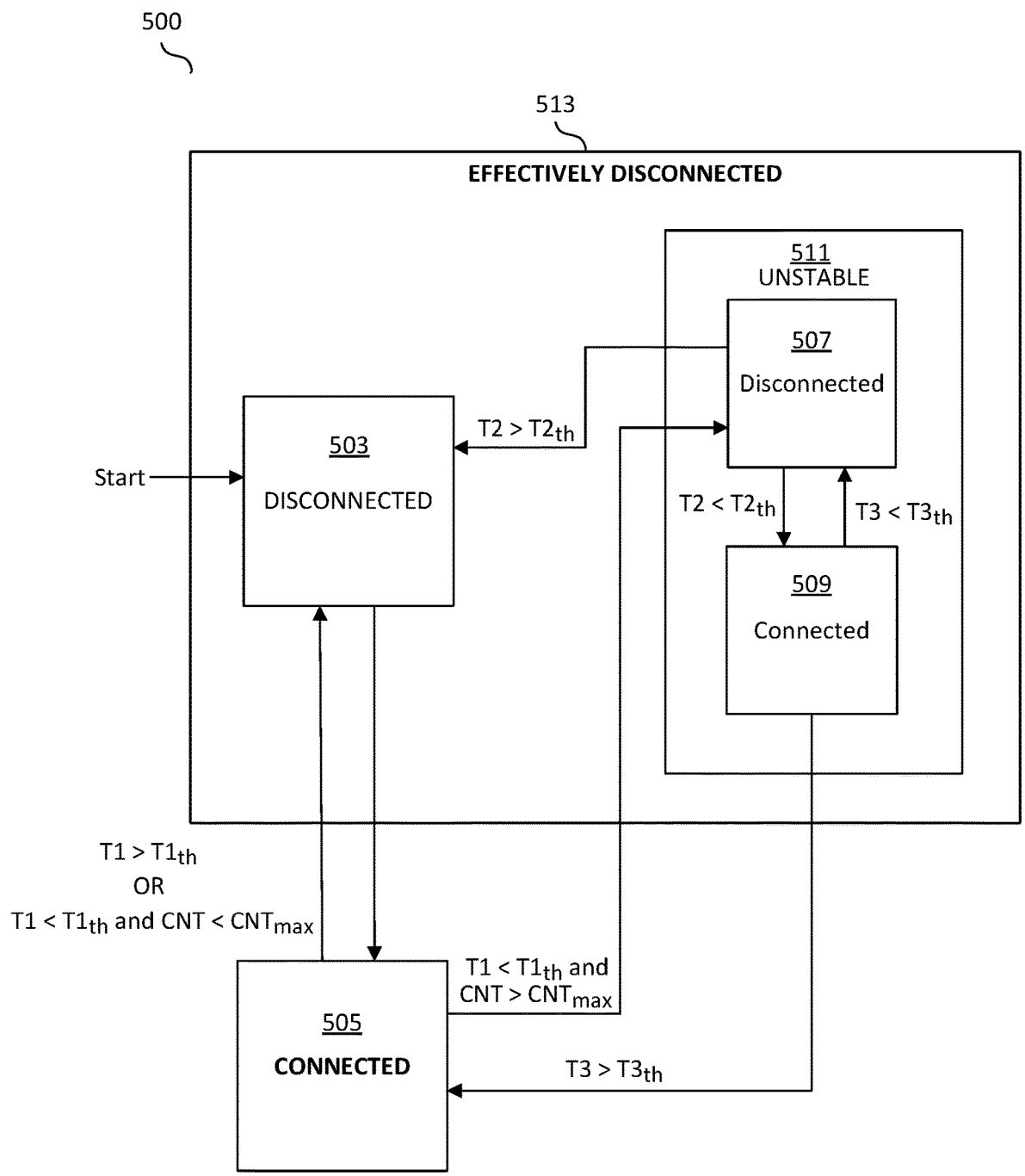
FIG. 5 illustrates an example state diagram for managing and utilizing an unstable connection state, according to certain implementations.

FIG. 5 illustrates another example state diagram for managing and utilizing an unstable connection state, according to certain implementations. The state machine illustrated in this figure is similar to that discussed with respect to FIG. 4. As such, many details will not be repeated. This figure is presented as including two states, namely disconnected 513 and connected 505. The effectively disconnected state 513 includes a stable disconnected state 503 and unstable state 511. The unstable state 511 further includes an unstable disconnected sub-state 507 and unstable connected sub-state 509.

Unlike unstable state 411 in state machine 400, unstable state 511 is a state within disconnected state 513. In some implementation, the system may provide notification to the user when transitioning between the disconnected state 503 and the connected state 505. The unstable state 511 may appear effectively disconnected to an end user while the system may be operationally connected. For example, the system may provide a notification such as "DISCONNECTED-unstable connection" to indicate to the user that the connection is in the unstable disconnected sub-state 507 or unstable connected sub-state 509.

Figure 6:
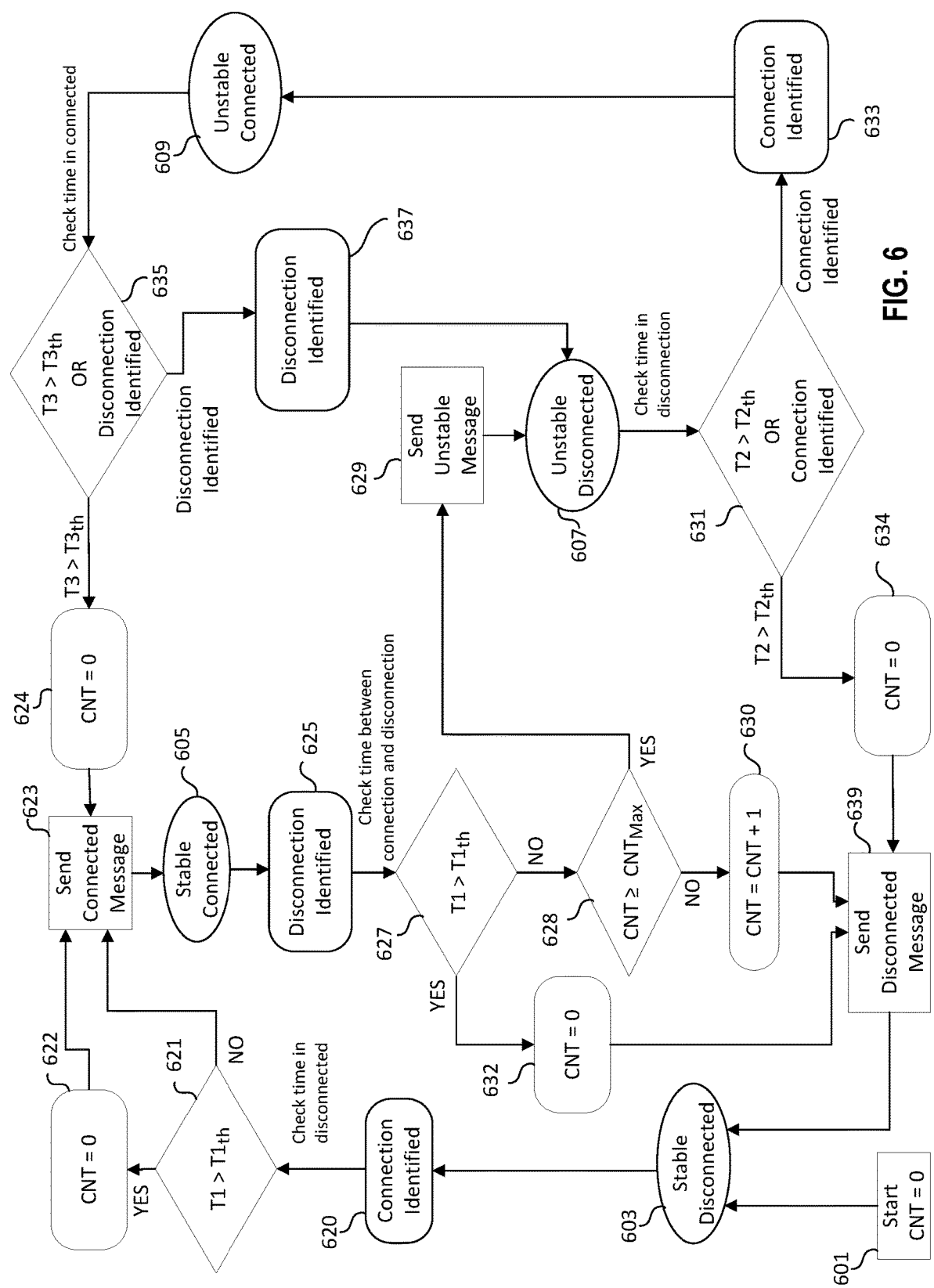
FIG. 6 illustrates an example flowchart for managing and utilizing an unstable connection state, according to certain implementations.

FIG. 6 illustrates an example implementation for managing and utilizing an unstable connection state, according to certain implementations. The example implementation illustrated in this figure is similar to that discussed with respect to FIG. 2B, FIG. 4, and FIG. 5. As such, many details will not be repeated. Unlike the example implementation of FIG. 2B, this example implementation incorporates a loop counter similar to that discussed with respect to FIG. 4 and FIG. 5.

The process begins at the start box 601 indicating the initiation of a state monitoring sequence. The loop count begins at CNT=0 at initiation. After initiation, the flowchart shows a transition to a stable disconnected state 603. When the connection is initiated between the client 102 and the cloud service 104, the connection management module 106 identifies that a connection has been made, as shown, for example, in box 620. When the connection is identified, the connection management module 106 checks the time in the stable disconnected state 603. When the time T1 in the stable disconnected state 603 is greater than the first time threshold $T1_{th}$, the flow transitions to box 622 to reset the loop count CNT to zero and then proceeds to send a connected message in box 623 and to the stable connected state 605. When the time in the stable disconnected state 603 is less than the first time threshold $T1_{th}$, the flow transitions to send a connected message in box 623 without resetting the loop count CNT and proceeds to the stable connected state 605.

From the stable connected state 605, when a disconnection is identified, as shown in box 625, the connection management module 106 checks the time between the connection identified in box 620 and the disconnection identified in box 625. In decision diamond 627, when the first time duration T1 is greater than the first time threshold $T1_{th}$, the flow transitions to box 632 to reset the loop count CNT to zero and transitions to send a disconnected message in box 639 which returns to the stable disconnected state 603.

When the first time duration T1 between the connection and disconnection is less than the first time threshold as determined in decision diamond 627, the flow transitions to decision diamond 628, when the loop count CNT is less than the maximum count threshold $CNT_{max}$ in decision diamond 628, the loop count CNT is incremented by CNT+1 and proceeds to send a disconnected message in box 639 and the stable disconnected state 603. On the other hand, when the loop count CNT is equal to or greater than the maximum count threshold $CNT_{max}$ in decision diamond 628, the flow transitions to send an unstable message in box 629. The flow into and out of the unstable states is similar to that discussed above with respect to FIG. 2B.

The loop count CNT is reset to CNT=0, as shown in box 622 and box 624, when the flow transitions to send a connected message in box 623 or, as shown in box 632 and box 634, when the flow transitions to send a disconnected message in box 639.

Figure 7:
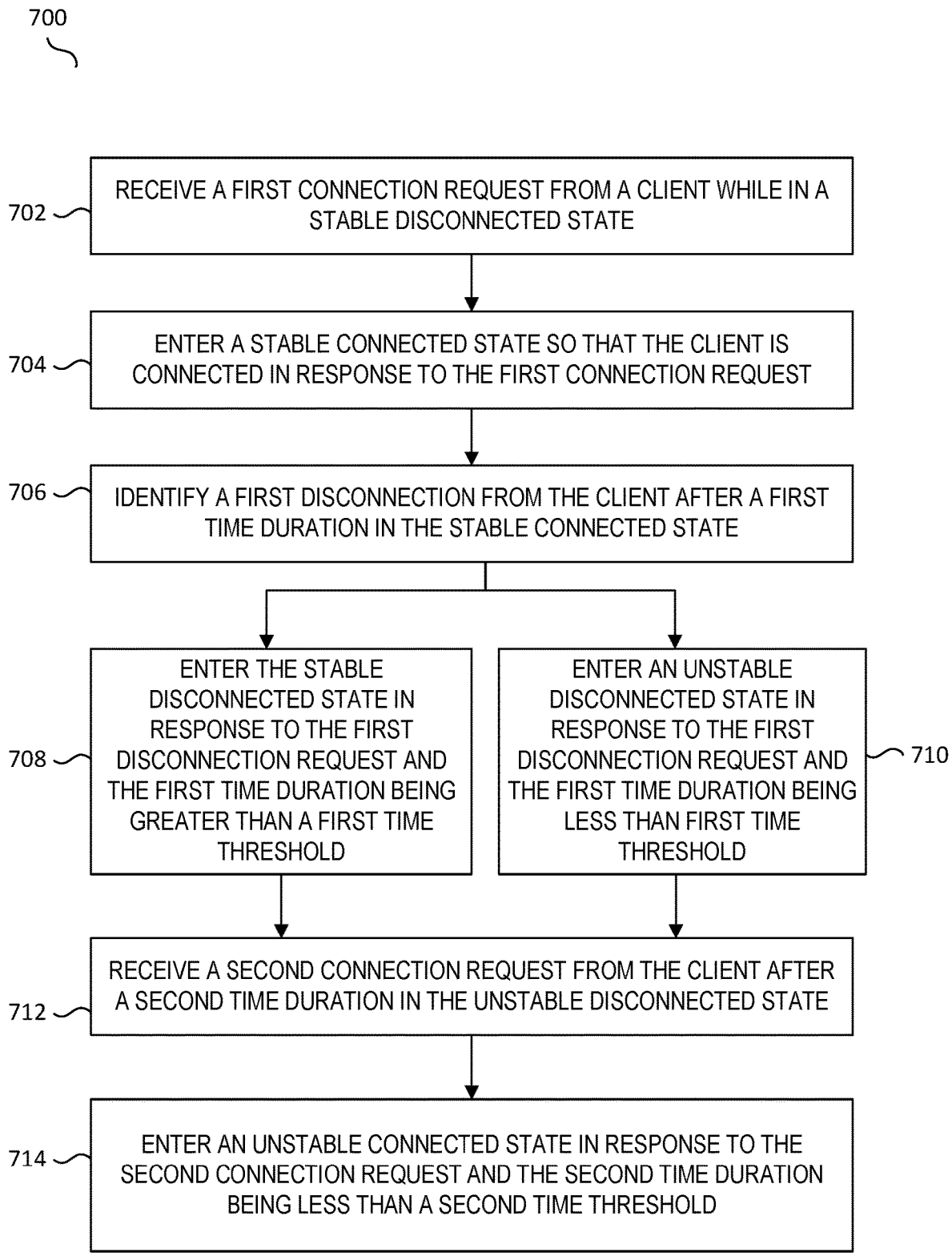
FIG. 7 illustrates an example method for managing and utilizing an unstable connection state, according to certain implementations.

FIG. 7 illustrates an example method for managing and utilizing an unstable connection state, according to certain implementations. The flowchart 700 of the method for managing and utilizing an unstable connection state will be described in conjunction with FIG. 1, FIG. 2A, and FIG. 4. The process begins with step 702 where the server 104 receives a first connection request from a client 102 while in a stable disconnected state 203. This leads the system 100 to enter a stable connected state 205 in step 704 to establish a connection between the server 104 and the client 102 in response to the first connection request. In some aspects, the request to connect may be received from the client 102 that includes a cloud-based service, an on-premises application, or a device.

Subsequently, in step 706, the server 104 identifies a first disconnection after the connection has been maintained for a first time duration T1 in the stable connected state 205. In step 708, the system 100 enters the stable disconnected state 203 when the first disconnection occurs when the first time duration T1 is greater than a first time threshold $T1_{th}$. This approach provides a mechanism for managing stable disconnections, thereby enhancing the efficiency and effectiveness of cloud connection state management. However, when the first disconnection occurs within the first time threshold $T1_{th}$, indicating potential instability, the system 100 enters an unstable disconnected state 207 in step 710.

The process continues to step 712 when the server receives a second connection request from the client 102 after the system 100 has been in the unstable disconnected state 203 for a second time duration T2. In step 714, the system 100 transitions to an unstable connected state 209 in response to the second connection request when the second time duration T2 in the unstable disconnected state 207 is less than a second time threshold $T2_{th}$. This sequence of events illustrates the method's approach to handling cloud connection states by introducing additional states to manage unstable connections effectively.

In some aspects, the method includes a loop count incrementation. The method incorporating the loop count incrementation will be described in conjunction with FIG. 1 and FIG. 4. The connection management module 106 may track the state of the cloud connection and the loop count incrementation in some implementations. In step 704, the connection management module 106 may increment the loop count CNT in response to entering the stable connected state 405. The loop count CNT is reset when entering the unstable disconnected state 407 in step 712 or when transitioning from the unstable state 411 to either the stable disconnected state 403 or the stable connected state 405. This approach provides a mechanism for tracking the number of connection and disconnection cycles, thereby enhancing the efficiency and effectiveness of cloud connection state management.

In some aspects, the method includes entering the stable disconnected state 203 in response to being in the unstable disconnected state 207 for a second time duration T2 that is greater than a second time threshold $T2_{th}$. After being in the unstable disconnected state 207 for the second time duration T2, the connection management module transitions to the stable disconnected state 203 which indicates a stable disconnection between the client 102 and the server 104.

In some aspects, the method includes entering the stable connected state 205 in response to being in the unstable connected state 209 for a third time duration T3 that is greater than a third time threshold $T3_{th}$. After being in the unstable connected state 209 for the third time duration T3, the connection management module transitions to the unstable connected state 209 which indicates a stable connection between the client 102 and the server 104.

In some aspects, the method includes entering the unstable disconnected state 207 in response to identifying a second disconnection while in the unstable connected state 209 and when the third time duration T3 is less than the third time threshold $T3_{th}$. When the system 100 identifies a second disconnection while in the unstable connected state 209, the connection management module transitions to the unstable disconnected state 207 to indicate instability in the connection between the client 102 and the server 104.

In some aspects, the method includes transmitting a connection status report to the client in response to entering or leaving an unstable state 211, where the unstable state 211 includes the unstable disconnected state 207 in step 708 and the unstable connected state 209 in step 712. This approach provides a mechanism for notifying the client of changes in the connection state, thereby enhancing the client's awareness of the connection state and enabling them to take appropriate actions to maintain a stable connection.

In some cases, the method includes incrementing a loop count when in the stable connected state 405 in step 704. The method includes entering the unstable disconnected state 407 in response to identifying a first disconnection, the first time duration T1 being less than the first time threshold $T1_{th}$, and the loop count CNT being greater than or equal to a loop count threshold $CNT_{max}$. This approach provides a mechanism for managing rapid changes in the connection state, thereby enhancing the efficiency and effectiveness of cloud connection state management.

In some cases, the method includes re-entering the stable connected state 405, incrementing a loop count CNT when in the stable connected state 405, and entering the stable disconnected state 403 in response to identifying a later disconnection, the first time duration T1 being less than the first time threshold $T1_{th}$, and the loop count CNT being less than a loop count threshold $CNT_{max}$.

In some aspects, the method includes a loop count CNT that is incremented upon entering the stable connected state 405, the loop count CNT that is incremented upon entering the stable disconnected state 403, and the loop count CNT is reset after being in the stable connected state 405 or stable disconnected state 403 for more than a predetermined period of time.

Figure 8:
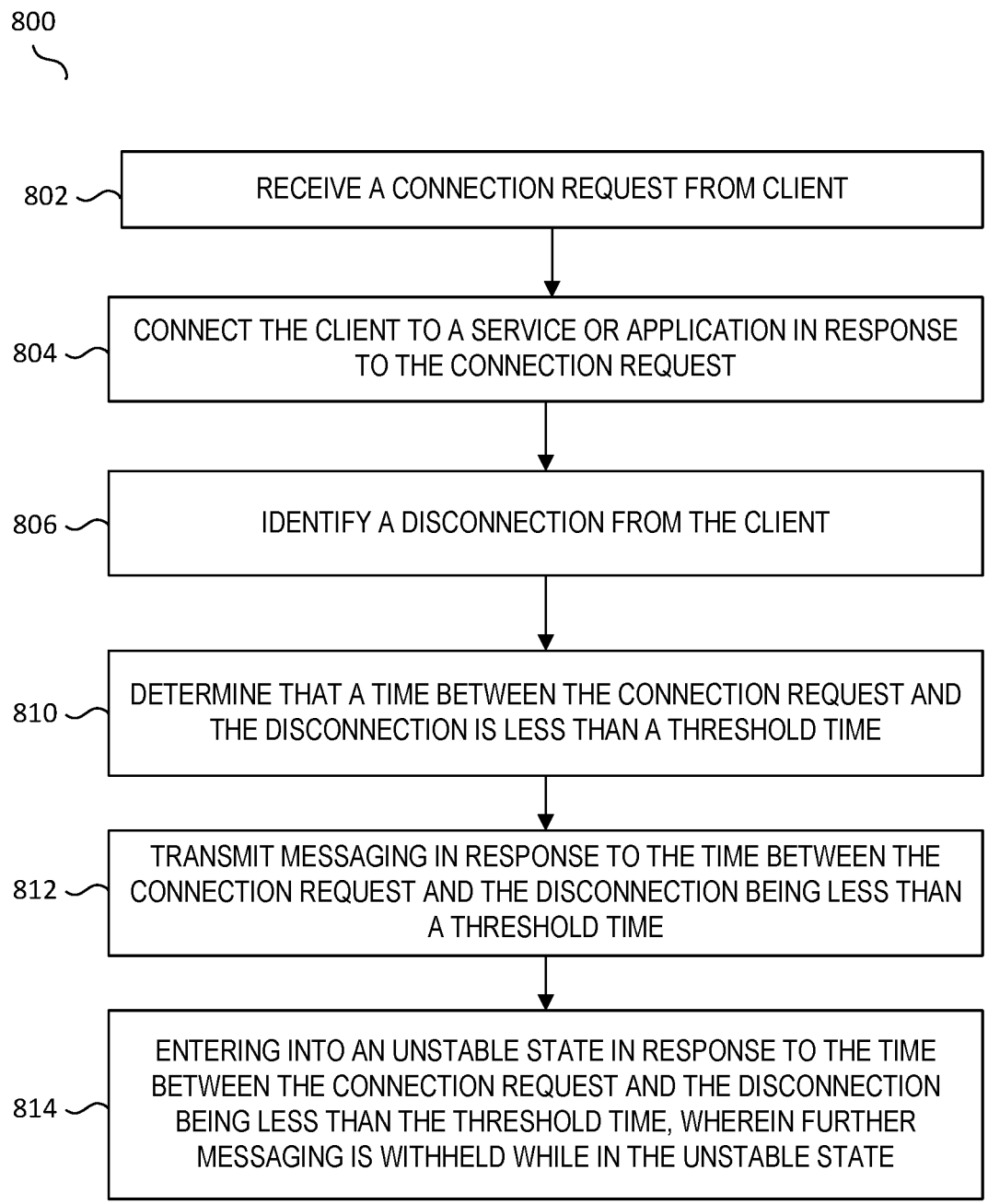
FIG. 8 illustrates an example method for managing and utilizing an unstable connection state, according to certain implementations.

FIG. 8 illustrates an example method for managing and utilizing an unstable connection state, according to certain implementations. The flowchart 800 of the method for managing and utilizing an unstable connection state will be described in conjunction with FIG. 1 and FIG. 3. Turning now to FIG. 8, a flowchart of a method for managing cloud connection states is depicted. The process begins in step 802 when a server 104 receives a connection request from a client 102. In some aspects, the client 102 may be a cloud-based service, an on-premises application, or a device. This leads to client-server connection establishment in step 804, where the client 102 is connected to a server 104 in response to the connection request. The server 104, in some cases, may be a cloud-based service.

Subsequently, in step 806, the server identifies a disconnection from the client 102. This indicates that the client 102 is disconnected from the server 104. This disconnection may occur for a variety of reasons, such as network issues, server issues, or at the request of the client.

Following the disconnection, in step 810, a time between the connection request and the disconnection that is less than a threshold time is determined in block 310. This time may be used to assess the stability of the connection and to inform subsequent actions.

In step 812, a message is transmitted in response to the time between the connection request and the disconnection being less than a threshold time. This message may comprise detailed connection information, providing the user with comprehensive insights into the connection state. Subsequently, in step 814, the system enters into an unstable state in response to the time between the connection request and the disconnection request being less than the threshold time. While in the unstable state, further messages are withheld. The withheld message may reduce the processing load on the management service, management stack, database, and graphical user interface (GUI).

In some cases, transmitting the message may comprise transmitting a first connection status report to the client at a first predetermined frequency. This approach provides flexibility in managing cloud connections, enabling the system to adapt to varying connection conditions and user requirements.

Figure 9:
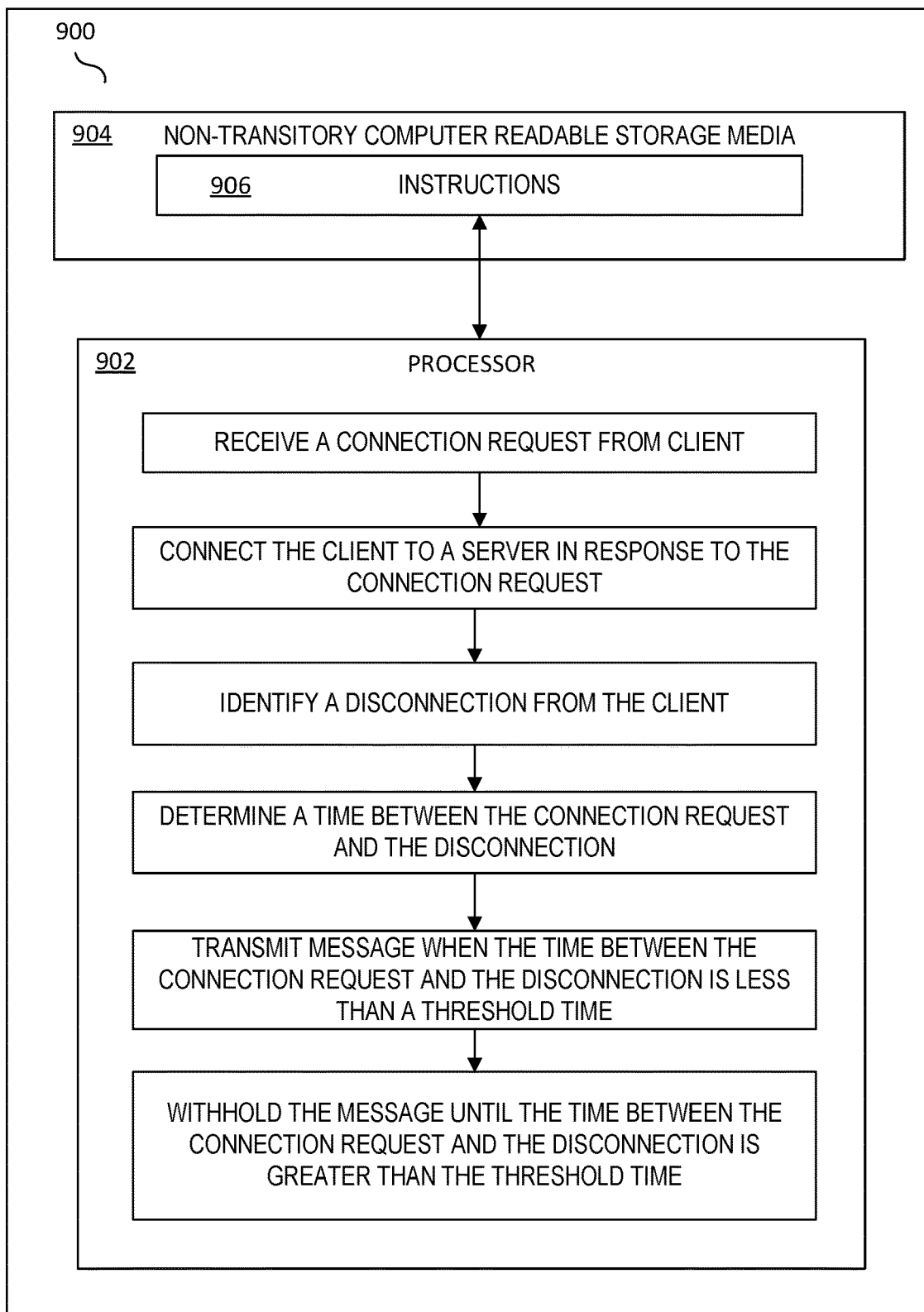
FIG. 9 illustrates a block diagram of an example computer system, according to certain implementations.

FIG. 9 illustrates an example system 900, according to certain implementations. Turning now to FIG. 9, a block diagram of a cloud connection state monitoring system is depicted. The system includes a central processing unit 902 which serves as the core component that receives and processes connection and disconnections. In some aspects, the central processing unit 902 may be a microprocessor, a microcontroller, a digital signal processor, or any other type of processing device. The central processing unit 902 may be configured to execute various operations, such as receiving a connection request from a client, connecting the client to a server, identifying a disconnection from the client, and disconnecting the client from the server. These operations may be performed in response to various events, such as user inputs, system events, or network events.

Connected to the central processing unit 902 is a storage medium 904. The storage medium 904 may be any type of storage device, such as a hard disk drive, a solid-state drive, a flash memory device, or a random-access memory device. In some cases, the storage medium 904 may be a non-volatile storage device that retains data even when power is not supplied. The storage medium 904 may store various types of data, such as system data, application data, user data, or network data.

Contained within the storage medium 904 are executable instructions 906. The executable instructions 906 dictate the operations of the central processing unit 902. In some aspects, the executable instructions 906 may be a software program, a firmware program, a script, or any other type of instructions that can be executed by the central processing unit 902. The executable instructions 906 may include various modules, routines, or functions that perform specific tasks, such as managing cloud connections, monitoring connection states, or processing connections and disconnections.

In operation, the central processing unit 902 executes the executable instructions 906 to perform various tasks. For example, the central processing unit 902 may receive a connection request from a client, connect the client to a server, identify a disconnection from the client, and then disconnect the client from the server. Additionally, the central processing unit 902 may determine the time between the connection and disconnection and transmit reports based on whether this time is greater or less than a threshold time. In some cases, if the time is less than the threshold, the central processing unit 902 may transmit a second report having fewer bits than a first report. This approach allows for efficient communication of connection state changes, reducing the processing load on the management service, management stack, database, and graphical user interface (GUI).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for managing and utilizing an unstable connection state. The method includes receiving a first connection request from a client while in a stable disconnected state and entering a stable connected state so that the client is connected to a server in response to the first connection request. The method also includes identifying a first disconnection from the client after a first time duration in the stable connected state and entering an unstable disconnected state in response to identifying the first disconnection and the first time duration being less than a first time threshold. The method also includes entering an unstable disconnected state in response to identifying the first disconnection and the first time duration being less than the first time threshold. The method also includes receiving a second connection request from the client after a second time duration in the unstable disconnected state and entering an unstable connected state in response to the second connection request and the second time duration being less than a second time threshold. Other embodiments of this aspect include corresponding computer systems, apparatus, and computer programs recorded on one or more computer storage devices, each configured to perform the actions of the methods.

Another general aspect provides a computer-implemented method for managing and utilizing an unstable connection state that includes receiving a connection request from a client and connecting the client to a server in response to the connection request. The method also includes identifying a disconnection from the client. The method further includes determining a time between the connection request and the disconnection, transmitting messaging when the time between the connection request and the disconnection is less than a threshold time, and withholding the messaging until the time between the connection request and the disconnection request is greater than the threshold time.

Another general aspect includes a cloud connection apparatus for managing and utilizing an unstable connection state. The cloud connection apparatus includes a first input configured to be connected to a client, a second input configured to be connected to a cloud service, and circuitry coupled to the first and second inputs. The circuitry is configured to implement a state machine having a stable disconnected state, a stable connected state, an unstable disconnected state, and an unstable connected state. The state machine starts in the stable disconnected state, and the state machine is configured to transition from the stable disconnected state to the stable connected state in response to a connection request during which messaging is communicated between the client and the cloud service. The state machine transitions from the stable connected state to the unstable disconnected state in response to identifying a disconnection when a first time duration in the stable connected state is less than a first time during which limited messaging is communicated between the client and the cloud service. The state machine transitions from the unstable disconnected state to the unstable connected state in response to a second connection request during which no messaging is communicated between the client and the cloud service.

Certain implementations may provide none, some, or all of the following technical advantages. These and other potential technical advantages may be described elsewhere in this disclosure, or may otherwise be readily apparent to those skilled in the art based on this disclosure.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A computer-implemented method, comprising:
   receiving a first connection request from a client while in a stable disconnected state;
   entering a stable connected state so that the client is connected to a server in response to the first connection request;
   identifying a first disconnection from the client after a first time duration in the stable connected state;
   entering the stable disconnected state in response to identifying the first disconnection and the first time duration being greater than a first time threshold;
   entering an unstable disconnected state in response to identifying the first disconnection and the first time duration being less than the first time threshold;
   receiving a second connection request from the client after a second time duration in the unstable disconnected state;
   entering an unstable connected state in response to the second connection request and the second time duration being less than a second time threshold; and
   resetting a loop count when entering the unstable disconnected state.

2. The computer-implemented method of claim 1, further comprising entering the stable disconnected state in response to being in the unstable disconnected state for a second time duration that is greater than a second time threshold.

3. The computer-implemented method of claim 1, wherein, when in the unstable connected state, the method further comprises:
   entering the stable connected state in response to being in the unstable connected state for a third time duration that is greater than a third time threshold; and
   entering the unstable disconnected state in response to identifying a second disconnection while in the unstable connected state and when the third time duration is less than the third time threshold.

4. The computer-implemented method of claim 1, further comprising:
   transmitting a connection status report to the client in response to entering or leaving an unstable state, wherein the unstable state comprises the unstable disconnected state and the unstable disconnected state.

5. The computer-implemented method of claim 1, wherein:
   the client comprises an on-prem based service, an on-prem application, or a device; and
   the server comprises a cloud-based service.

6. The computer-implemented method of claim 1, further comprising incrementing a loop count when entering the stable connected state; and
   wherein entering the unstable disconnected state comprises entering the unstable disconnected state in response to identifying a number of disconnections, the first time duration being less than the first time threshold, and the loop count being greater than or equal to a loop count threshold.

7. The computer-implemented method of claim 1, further comprising:
   re-entering the stable connected state from the stable disconnected state;
   incrementing a loop count when re-entering the stable connected state; and
   entering the stable disconnected state in response to identifying a later disconnection, the first time duration being less than the first time threshold, and the loop count being less than a loop count threshold.

8. The computer-implemented method of claim 1, wherein:
   a loop count is incremented upon entering the stable connected state from the stable disconnected state; and
   the loop count is reset after being in the stable disconnected state or stable connected state for more than a predetermined period of time.

9. The computer-implemented method of claim 1, wherein:
   a loop count is incremented upon entering the stable connected state from the stable disconnected state.

10. A computer-implemented method, comprising:
    receiving a connection request from a client;
    connecting the client to a service or application in response to the connection request;
    identifying a disconnection from the client;
    determining that a time between the connection request and the disconnection is less than a threshold time;
    transmitting messaging in response to the time between the connection request and the disconnection being less than a threshold time;
    entering into an unstable state in response to the time between the connection request and the disconnection being less than the threshold time, wherein further messaging is withheld while in the unstable state; and
    resetting a loop count when entering the unstable disconnected state.

11. The computer-implemented method of claim 10, wherein the messaging comprises transmitting a connection status report to the client.

12. The computer-implemented method of claim 10, wherein connecting the client to the service or application comprises running jobs or workflows.

13. The computer-implemented method of claim 10, wherein:
    the client comprises a cloud-based service, an on-premises application, or a device; and
    the service or application comprises a cloud-based service.

14. A cloud connection apparatus comprising:
    a first input configured to be connected to a client;
    a second input configured to be connected to a service or application;
    circuitry coupled to the first and second inputs, wherein the circuitry is configured to implement a state machine having a stable disconnected state, a stable connected state, an unstable disconnected state, and an unstable connected state;

wherein the state machine starts in the stable disconnected state;

wherein the state machine is configured to transition from the stable disconnected state to the stable connected state in response to a connection request during which messaging is communicated between the client and the service or application;

wherein the state machine is configured to transition from the stable connected state to the stable disconnected state when a first time duration is greater than a first time threshold in the stable connected state;

wherein the state machine transitions from the stable connected state to the unstable disconnected state in response to identifying a disconnection when the first time duration in the stable connected state is less than the first time threshold during which limited messaging is communicated between the client and the service or application; and wherein the state machine is configured to transition from the unstable disconnected state to the unstable connected state in response to a second connection request during which no messaging is communicated between the client and the service or application.

15. The cloud connection apparatus of claim 14, wherein:
the messaging comprises detailed connection information; and
the limited messaging comprises less detailed connection information than the messaging.

16. The cloud connection apparatus of claim 14, wherein the state machine is configured to transition from the unstable disconnected state to the stable disconnected state in response to being in the unstable disconnected state for a second time duration that is greater than a second time threshold.

17. The cloud connection apparatus of claim 14, wherein the state machine is configured to:

transition from the unstable connected state to the stable connected state in response to being in the unstable connected state for a third time duration that is greater than a third time threshold; and transition from the unstable connected state to the unstable disconnected state in response to identifying another disconnection when the third time duration is less than the third time threshold.

18. The cloud connection apparatus of claim 14, wherein the state machine is configured to:
increment a loop count when in the stable connected state; and
wherein when the state machine transitions from the stable connected state to the unstable disconnected state comprises transitioning to the unstable disconnected state in response to identifying a number of disconnections, the first time duration being less than the first time threshold, and the loop count being greater than or equal to a loop count threshold.

19. The cloud connection apparatus of claim 14, wherein the state machine is configured to:
re-enter the stable connected state;
increment a loop count when in the stable connected state; and
transition from the stable connected state to the stable disconnected state in response to identifying a later disconnection, the first time duration being less than the first time threshold, and the loop count being less than a loop count threshold.

20. The cloud connection apparatus of claim 14, wherein the state machine is configured to:
increment a loop count upon transitioning to the stable connected state; and
reset the loop count when entering the unstable disconnected state.

* * * * *